United States Patent
Bouthemy et al.

(10) Patent No.: US 11,831,803 B1
(45) Date of Patent: Nov. 28, 2023

(54) GHOST CALL VULNERABILITY DURING CALL SETUP SILENT VOICE OVER IP DENIAL-OF-SERVICE

(71) Applicant: T-Mobile Innovations LLC, Overland Park, KS (US)

(72) Inventors: Jean-Luc Rene Bouthemy, Sammamish, WA (US); Khurram Ahmad Mirza, Redmond, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

(21) Appl. No.: 17/736,814

(22) Filed: May 4, 2022

(51) Int. Cl.
*H04M 3/00* (2006.01)
*H04M 3/22* (2006.01)
*H04L 65/1069* (2022.01)
*H04L 65/1104* (2022.01)

(52) U.S. Cl.
CPC ...... *H04M 3/2281* (2013.01); *H04L 65/1069* (2013.01); *H04L 65/1104* (2022.05)

(58) Field of Classification Search
CPC .............. H04M 3/2281; H04L 65/1104; H04L 65/1069
USPC ........................................ 379/210.02, 210.01
See application file for complete search history.

(56) References Cited

U.S. PATENT DOCUMENTS

| | | | | |
|---|---|---|---|---|
| 7,424,741 | B1 * | 9/2008 | Grimm | H04L 63/1458 726/13 |
| 2003/0171120 | A1 * | 9/2003 | Mustapha | H04W 12/126 455/445 |
| 2005/0108567 | A1 * | 5/2005 | D'Souza | H04L 63/1458 726/4 |

(Continued)

FOREIGN PATENT DOCUMENTS

WO    WO-2022079501 A1 *   4/2022   ............. H04L 29/06

OTHER PUBLICATIONS

Lu et al., "Ghost Calls from Operational 4G Call Systems: IMS Vulnerability, Call DoS Attack, and Countermeasure", Proceedings of the 26th Annual International Conference on Mobile Computing and Networking, Sep. 21-25, 2020, 14 pages.

(Continued)

*Primary Examiner* — William J Deane, Jr.
(74) *Attorney, Agent, or Firm* — Shook, Hardy & Bacon L.L.P.

(57) ABSTRACT

Systems and methods for detecting and preventing a denial-of-service attack at one or more victim agents of a telecommunication network include one or more session management systems communicatively coupled to one or more attacker agents. The one or more session management systems to receive a call initiation message during a session, provide a provisional response during the session, activate a connection timer, determine whether a provisional acknowledgement message is received within a pre-determined period associated with the connection timer, deactivate the connection timer if the provisional acknowledgement message is not received within the pre-determined period, determine whether a call counter is greater than or equal to a threshold in response to the connection timer deactivation, and activate a block timer if the call counter is greater than or equal to the threshold. The block timer to block one or more calls from the attacker agent.

20 Claims, 5 Drawing Sheets

(56) References Cited

U.S. PATENT DOCUMENTS

| | | | | |
|---|---|---|---|---|
| 2006/0045098 A1* | 3/2006 | Krause | ............... | H04L 69/162 |
| | | | | 370/396 |
| 2008/0117925 A1* | 5/2008 | Curtis | ................. | H04L 67/63 |
| | | | | 370/232 |
| 2015/0026793 A1* | 1/2015 | Li | ..................... | H04L 63/1458 |
| | | | | 726/12 |

OTHER PUBLICATIONS

Wang et al., "Insecurity of Operational Cellular IoT Service: New Vulnerabilities, Attacks, and Countermeasures", Proceedings of the 27th Annual International Conference on Mobile Computing and Networking, Jan. 31-Feb. 4, 2022, 14 pages.

* cited by examiner

GHOST CALL VULNERABILITY DURING CALL SETUP SILENT VOICE OVER IP DENIAL-OF-SERVICE

SUMMARY

The present disclosure is directed, in part, to preventing a denial-of-service attack at a victim agent of a telecommunication network, substantially as shown in and/or described in connection with at least one of the figures, and as set forth more completely in the claims.

In aspects set forth herein, a victim agent is connected to a telecommunication network. Typically, an attacker agent initiates, by a call initiation message requiring acknowledgement of all provisional messages, a VoIP (Voice over IP or video call over IP) call to a victim agent. The victim agent acknowledges the call initiation message by sending a response message to the attacker agent. The victim agent expects to receive an acknowledgment message from the attacker agent. During a denial-of-service attack, the attacker agent does not send the acknowledgement message. The victim agent becomes stuck such that the victim agent is unable to make or receive another call. However, here, one or more session management systems receive a call initiation message during a session, determine whether a provisional acknowledgement message is received within a pre-determined period of activation of a connection timer, and activate a block timer if a call counter is greater than or equal to a threshold. The block timer is structured to block one or more calls from the attacker agent which permits the victim agent to make and receive calls during the attack.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for detecting one or more denial-of-service attacks at one or more victim agents of a telecommunication network. A call initiation message is received during a session. The one or more session management systems are structured to provide the call initiation message to the one or more victim agents. A provisional response is provided during the session. The one or more session management systems are structured to provide the provisional response to the one or more attacker agents. A connection timer is activated. Whether a provisional acknowledgement message is received within a pre-determined period associated with the connection timer is determined. The connection timer is deactivated if the provisional acknowledgement message is not received within the pre-determined period. Whether a call counter is greater than or equal to a threshold is determined in response to the connection timer deactivation. A block timer is activated if the call counter is greater than or equal to the threshold. The block timer is structured to block one or more calls from the attacker agent.

Advantageously, detecting a denial-of-service attack at one or more victim agents, provides the victim agent(s) the ability to place one or more calls during the denial-of-service attack(s).

In one aspect, a method is provided for preventing a denial-of-service attack at a victim agent of a telecommunication network. The method includes receiving, by one or more session management systems communicatively coupled to one or more attacker agents and one or more victim agents, a call initiation message during a session. The one or more session management systems are structured to provide the call initiation message to the one or more victim agents. The method also includes providing a provisional response during the session. The one or more session management systems are structured to provide the provisional response to the one or more attacker agents. The method further includes activating a connection timer. The method further includes determining whether a provisional acknowledgement message is received within a pre-determined period associated with the connection timer. The method further includes deactivating the connection timer if the provisional acknowledgement message is not received within the pre-determined period. The method further includes determining whether a call counter is greater than or equal to a threshold in response to the connection timer deactivation. The method further includes activating a block timer if the call counter is greater than or equal to the threshold. The block timer is structured to block one or more calls from the attacker agent.

In another aspect, a computer-readable storage media having computer-executable instructions embodied thereon is provided that, when executed by one or more processors, cause the processors to perform various steps. The processors are caused to receive, by one or more session management systems communicatively coupled to an attacker agent and a victim agent, a call initiation message during a session. The one or more session management systems are structured to provide the call initiation message to the victim agent. The processors are caused to provide a provisional response during the session, wherein the one or more session management systems are structured to provide the provisional response to the attacker agent. The processors are also caused to activate a connection timer. The processors are also caused to determine whether a provisional acknowledgement message is received within a pre-determined period associated with the connection timer. The processors are also caused to deactivate the connection timer if the provisional acknowledgement message is not received within the pre-determined period. The processors are also caused to determine whether a call counter is greater than or equal to a threshold in response to the connection timer deactivation. The processors are also caused to activate a block timer if the call counter is greater than or equal to the threshold, wherein the block timer is structured to block one or more calls from the attacker agent.

In yet another aspect, a system is provided for detecting a denial-of-service attack at one or more victim agents of a telecommunication network. The system includes one or more victim agents and one or more cell sites including one or more session management systems communicatively coupled to one or more attacker agents and the one or more victim agents. The one or more session management systems receive a call initiation message during a session, wherein the one or more session management systems are structured to provide the call initiation message to the one or more victim agents. The one or more session management systems also provide a provisional response to the one or more attacker agents during the session. The one or more session management systems further activate a connection timer. The one or more session management systems further determine whether a provisional acknowledgement message is received from the one or more attacker agents within a pre-determined period associated with the connection timer. The one or more session management systems further deactivate the connection timer if the provisional acknowledgement message is not received within the pre-determined period. The one or more session management systems further determine whether a call counter is greater than or equal to a threshold in response to the connection timer deactivation. The one or more session management systems further activate a block timer if the call counter is greater than or equal to the threshold, wherein the block timer is structured to block one or more calls from the attacker agent.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, non-transitory and/or transitory media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "agent device," "user equipment," "UE," "attacker agent," "victim agent," and "user device" are used interchangeably to refer to a device employed by an end-user that communicates using a network. An agent device is a logical network endpoint that sends or receives Session Initiation Protocol (SIP) messages and/or manages SIP sessions. In some examples, an agent device may have client and/or server components. An agent device may be deployed in a networking device (e.g., a device connected to a fixed and/or mobile network) such as a UE, consumer device, Internet of Things (JOT) devices, etc. UE generally includes one or more antenna coupled to a radio for exchanging (e.g., transmitting and receiving) transmissions with a nearby base station, via an antenna array of the base station, and/or to Access Points if Wi-Fi and/or Wi-Li is available. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using fixed and mobile networks (e.g., LTE, 5G, 6G, Wi-Fi, cable, satellite, etc.).

A "network" refers to a network comprised of wireless and wired components that provide wireless communications service coverage to one or more UE. The network may comprise an access network, core network(s), Voice over IP (VoIP) service, IP backbone, one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," "secondary," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
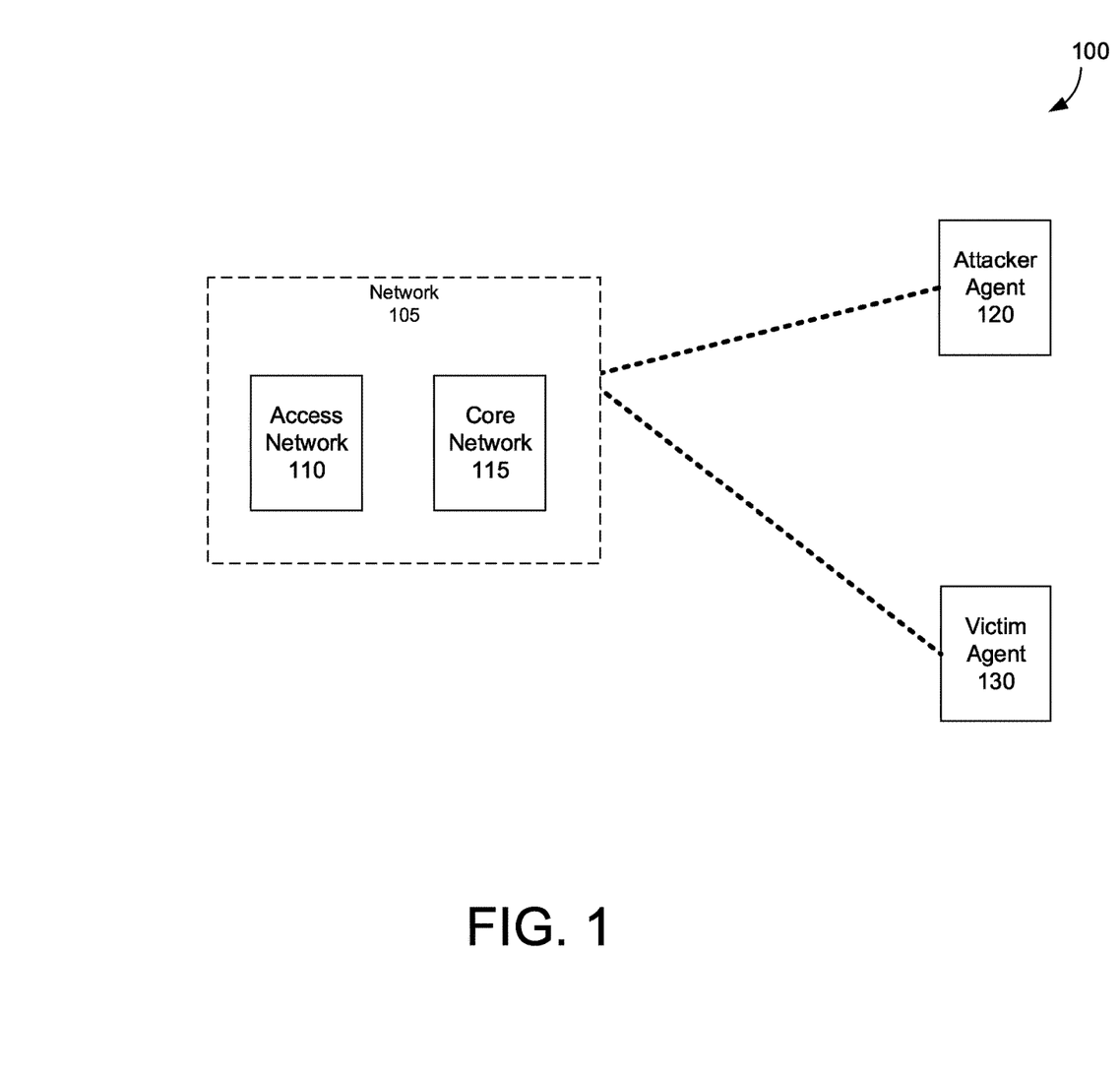
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more devices (e.g., the attacker agent 120 and the victim agent 130). In some embodiments, the network environment 100 may include a telecom network (e.g., a telecommunication network such as, but not limited to, a wireline, a satellite, and/or a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network 105 (e.g., a telecommunication network) included in the network environment 100 includes an access network 110. The access network 110 may be a fixed or mobile network that may be terrestrial or non-terrestrial. The access network(s) provide IP connectivity to agents 120 and 130. The access network 110 may be connected to a core network 115. In embodiments that include a wireless network, the core network 115 (e.g., an Enhanced Packet Core in 4G network, Service Based Architecture in 5G network, etc.) may be connected to a session management system (e.g., IP Multimedia Subsystem) which may provide voice service delivery, multimedia service delivery, message service delivery, and/or any other suitable services.

In some embodiments, the network 105 included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., one or more attacker agents and/or victim agents such as the devices 120 and 130) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, an attacker agent and/or a victim agent may connect to or otherwise access a 4G, LTE, 5G, or any other suitable network simultaneously. In the stand alone mode, the telecom network may take the form of a 5G, 6G, or any other suitable network.

In some embodiments, the network environment 100 may include one or more nodes communicatively coupled to one or more attacker agents and one or more victim agents such that the node(s) may transmit to and receive requests and/or data from the attacker agent(s) and/or the victim agent(s). The one or more nodes may include a Next Generation Node B (e.g., gNodeB or gNB) or any other suitable node. The one or more nodes may correspond to one or more frequency bands within which the attacker agent(s) and/or the victim agent(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the attacker agent(s) and/or the victim agent(s) may take the form of a wireless or mobile device capable of communication via the network environment 100. For example, the attacker agent 120 may take the form of a mobile device capable of communication via a telecom network such as, but not limited to, a wireless telecommunication network. In this regard, the attacker agent(s) and/or the victim agent(s) may be any computing device that communicates by way of a TCP/IP network, possibly relying on different access network technologies for example, a 4G, LTE, WiMAX, Wi-Fi, Wi-Li, 5G (5G SA and NSA), 6G, cable, satellite, or any other type of TCP/IP network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide IP services (e.g. for wireless operators LTE, 5G, 6G, voice, location, data, etc.) to one or more user devices. For example, the attacker agent 120 and/or the victim agent 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s) as an IP network. The access network 110 may be, for example, a Wi-Fi network, Wi-Li, 4G network (LTE, WiMAX, HSDPA), 5G network, 6G network, or a wireline network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2A:
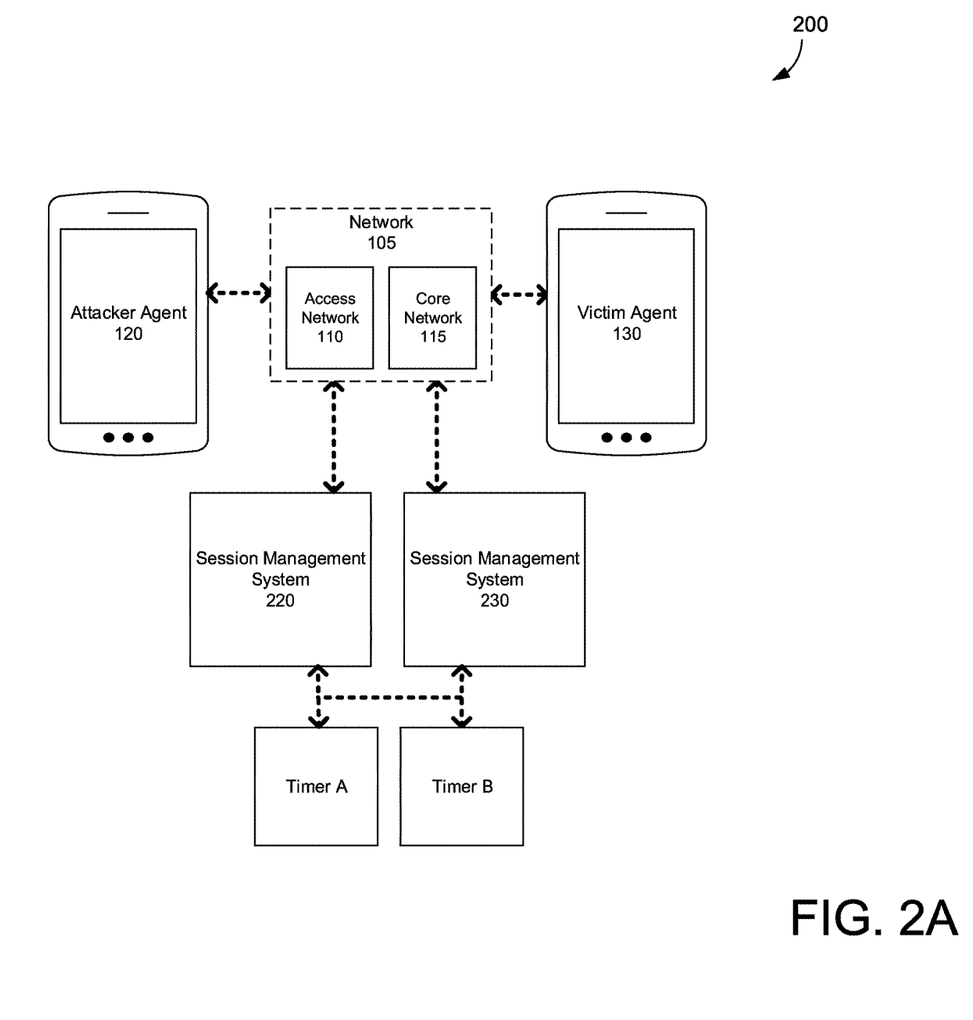
FIG. 2A is a diagram of a network environment including an attacker agent and a victim agent in accordance with an example embodiment.

FIG. 2A is a diagram of the network environment 200 (e.g., a telecommunication environment such as, but not limited to, a wireless telecommunication environment) according to an example embodiment. In the present embodiment, the network environment 200 includes one or more access networks 110, one or more core networks 115, attacker agent 120, victim agent 130, session management systems 220 and 230 (e.g., support for Voice over IP calls, such as, IMS (IP Multimedia Subsystem)), and timers A and B. Although some of the components in the network environment 200 are depicted as single components (e.g., a single victim agent, access network, core network, etc.), in some embodiments, the network environment 200 may include a plurality of such components.

The one or more session management systems (e.g., the one or more IMSs) may include or may otherwise take the form of a Session Border Controller (SBC), P-CSCF (Proxy-Call Session Control Function), I-CSCF (Interrogating Session Control Function), S-CSCF (Serving-Call Session Control Function), TAS (Telephony Application Server), and/or any other suitable node or function. The P-CSCF may take the form of a SIP proxy. A user device (e.g., the attacker agent 120) may contact the P-CSCF first to place/initiate a call or other requests (e.g., service requests) to/from another user device (e.g., the victim agent 130). The S-CSCF may register one or more sessions (e.g., user device sessions). As used herein, the term "session" may be used to refer to at least one of a call setup, video setup, or message setup. The session may be based on SIP. In some embodiments, the S-CSCF may determine whether service associated with the user device(s) may be allowed or denied. The attacker agent 120 and/or the victim agent 130 may be registered successfully on the session management system (e.g., the IMS).

Figure 2B:
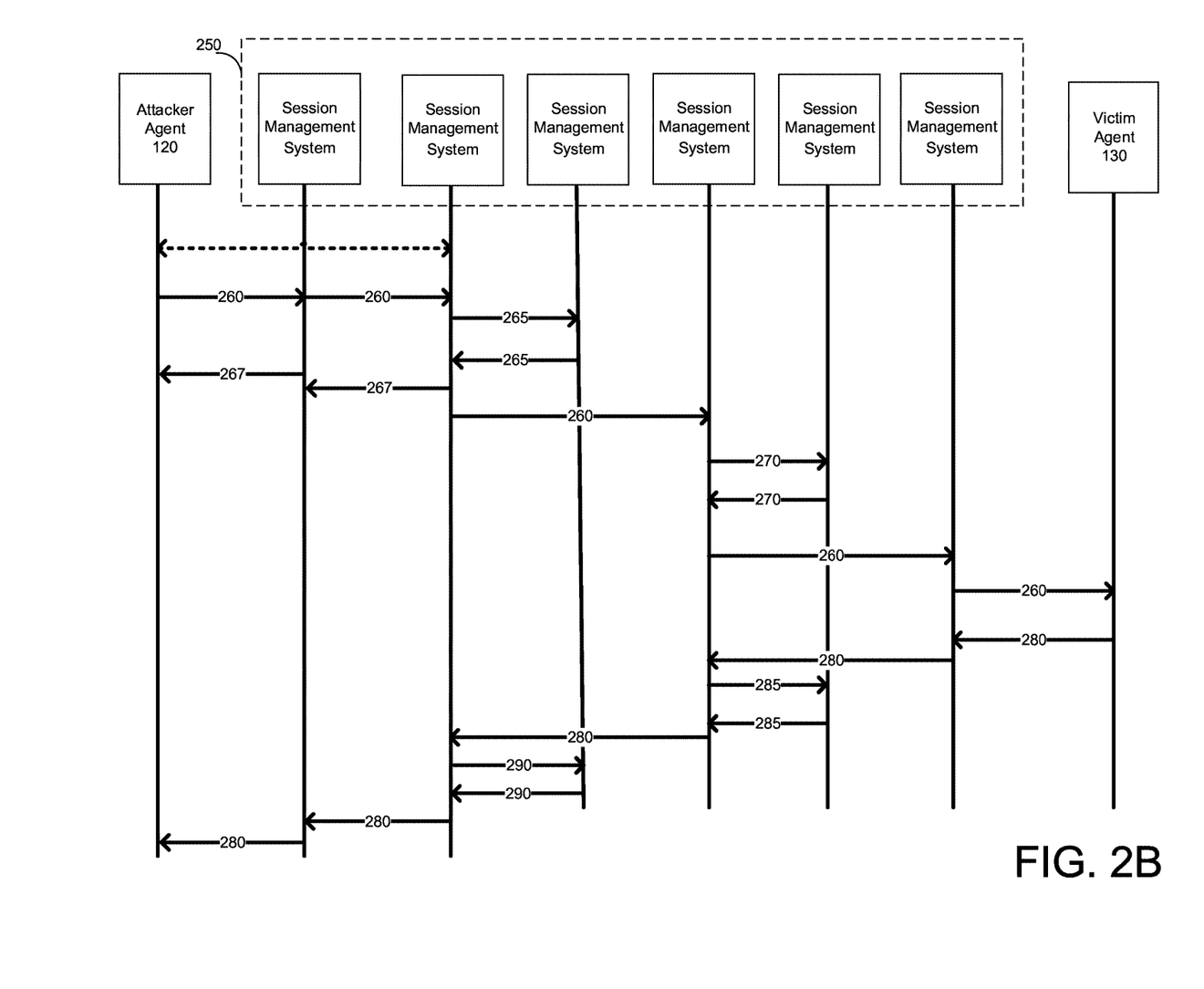
FIG. 2B is a diagram of a call setup in accordance with an example embodiment.

In some examples, the session management system may be communicatively coupled to one or more attacker agents and/or one or more victim agents. Alternatively or additionally, a plurality of session management systems (e.g., the session management system 220 and 230) may be communicatively coupled to one or more attacker agents and one or more victim agents (as shown in FIG. 2B). Various messages may be sent between the session management system(s), the victim agent(s), and/or the attacker agent(s) during the session. The session management system(s) may establish, modify, and tear down multimedia sessions.

The attacker agent may initiate a denial-of-service attack by installing, transferring, or otherwise providing a malicious application, mal-ware, and/or any other attack-enabled code, message, response, etc. on/to the victim agent. In some embodiments, the malicious application, for example, may take root to gain control, via a VoWiFi (Voice over Wi-Fi) SIP attack, of the victim agent. The malicious application may include a script which may call one or multiple victim agents at once. In some examples, the attacker agent may target one or more victim agents by utilizing the number (e.g., MSISDN (Mobile Station International Subscriber Directory Number) or any other number that identifies the victim agent(s) (such as IMEI or PEI, SIP URI and GRUU).

In some embodiments, the session management system(s) (e.g., the session management system 220) may receive a call initiation message during the session. The attacker agent (e.g., the attacker agent 120) may initiate a call (e.g., a Voice over IP (VoIP) call) to the victim agent (e.g., the victim agent 130). The attacker agent 120 may transmit a call initiation message (e.g., SIP INVITE) to the victim agent 130. The one or more session management systems may be structured to provide the call initiation message to the one or more victim agents. In this regard, the session management system(s) 220, 230, and/or 250 may receive, from the attacker agent 120, the call initiation message (e.g., SIP INVITE 260 shown in FIG. 2B). In turn, the session management system(s) may provide the call initiation message (e.g., SIP INVITE 260 shown in FIG. 2B) to the victim agent 130. For example, a first session management system 220 (e.g., P-CSCF, SBC, etc.) may forward the call initiation message to one or more secondary session management systems 230 or 250 (e.g., one or more other nodes such as, but not limited to, a mobile originated node (P-CSCF, I-CSCF, S-CSCF, TAS (Telephony Application Server), etc.) and/or a mobile terminated node (e.g., I-CSCF (Interrogating-Call Session Control Function), S-CSCF, TAS, P-CSCF, etc.) until the call initiation message is provided or otherwise reaches the victim agent 130. Alternatively or additionally, the session management system 220 and/or 230 may provide the call initiation message (e.g., SIP INVITE) to one or more applications associated with the victim agent 130. In some examples, the session management system(s) may provide a try response 267 (e.g., a 100 Trying message) to the attacker agent 120 in response to the call initiation message that notifies the attacker agent 120 that the call setup is in progress.

In some embodiments, the session management system(s) may provide a provisional response during the session. The one or more session management systems 220, 230 may be structured to provide the provisional response to the one or more attacker agents 120. The session management system may receive the provisional response from the victim agent 130 for provision to the attacker agent 120. The victim agent 120 may provide the provisional response in response to the call initiation message 260. The provisional response may include a 18x message (e.g., a 183 Session Progress message) as shown in FIG. 2B at 280, and/or any other suitable message. In some embodiments, the provisional response 280 may include one or more option tags (e.g., an option tag precondition, an option-tag such as, but not limited to, 100rel, etc.) in one or more headers or header fields (e.g., in the Require header, Call ID header, Contact header, Record-Route header, Expires header, etc.). The provisional response 280 (e.g., the 18x message) may be transmitted, sent, relayed, provided, or otherwise forwarded to the attacker agent 120 by one or more session management systems 250. In some examples, the provisional response may be relayed for mobile terminated P-CSCF, S-CSCF, and/or TAS. In some examples, the provisional response may be relayed for mobile originated S-CSCF, TAS, and/or P-CSCF.

In some examples, one or more session management systems may activate a connection timer. For example, the session management system 220 (e.g., the mobile originated P-CSCF, SBC, etc.) may activate or otherwise trigger the connection timer (e.g., the timer A). The connection timer may be activated at the reception of the provisional response (e.g., the 18x Session Progress message). The connection timer may terminate or otherwise expire when it reaches a maximum delay between the reception of the provisional response from the victim agent 130. In further embodiments, the connection timer may terminate when it reaches a maximum delay between receipt of a provisional response acknowledgement (PRACK) message sent by the attacker agent. When the connection timer terminates, a call counter (e.g., a ghost call counter) that corresponds to the attacker agent may be incremented. The call counter as further described herein may be initialized to 0.

The session management system(s) (e.g., session management systems 220, 230, or 250) may determine whether a provisional acknowledgement message is received within a pre-determined period associated with the connection timer activation. The provisional acknowledgement message may include or otherwise may take the form of the PRACK message. If the attacker agent 120 (e.g., caller device) does not send the provisional acknowledgement message (e.g., a PRACK message) within the pre-determined period, the session management system(s) may determine that the victim agent 130 has been victimized.

The one or more session management systems (e.g., performed in the mobile originated P-CSCF) may deactivate the connection timer if the provisional acknowledgement message is not received within the pre-determined period. For example, the session management system 220 may deactivate Timer A or otherwise may cause Timer A to expire.

The session management system(s) may determine whether the call counter is greater than or equal to a threshold in response to the connection timer deactivation. As used herein, the term "threshold" may be used to refer to the number of unacknowledged values permitted during a specific time period. The call counter may include a ghost call counter. The call counter may be incremented if the provisional acknowledgement message is not received within the pre-determined period. For example, the ghost call counter may be incremented each time the provisional response (e.g., SIP 18x Session Progress message 280) is not acknowledged by a provisional acknowledgement message (e.g., a PRACK message) within a time period associated with the connection timer (e.g., the Timer A).

In some embodiments, the session management system(s) 220 and/or 230 may activate a block timer (e.g., Timer B) if the call counter is greater than or equal to the threshold. The block timer may be structured to block one or more calls from the attacker agent 120. If the call counter is greater than or equal to the threshold, the call from the attacker agent 120 may be blocked, for example, based on a device identifier (e.g., the IP address, IMPU, SIP URI, GRUU, etc. of the attacker agent). In turn, the attacker agent 120 may be unable to place one or more calls while the block timer (e.g., Timer B) is active. After the attacker agent 120 is blocked by the session management system(s) 220 and/or 230 (e.g., the originating P-CSCF), the one or more victim agents are structured to at least one of receive one or more calls or place one or more calls during the period of time the block timer is activated. Advantageously, the denial-of-service attack is mitigated and the victim agent (s) can receive calls and/or place calls.

Figure 3:
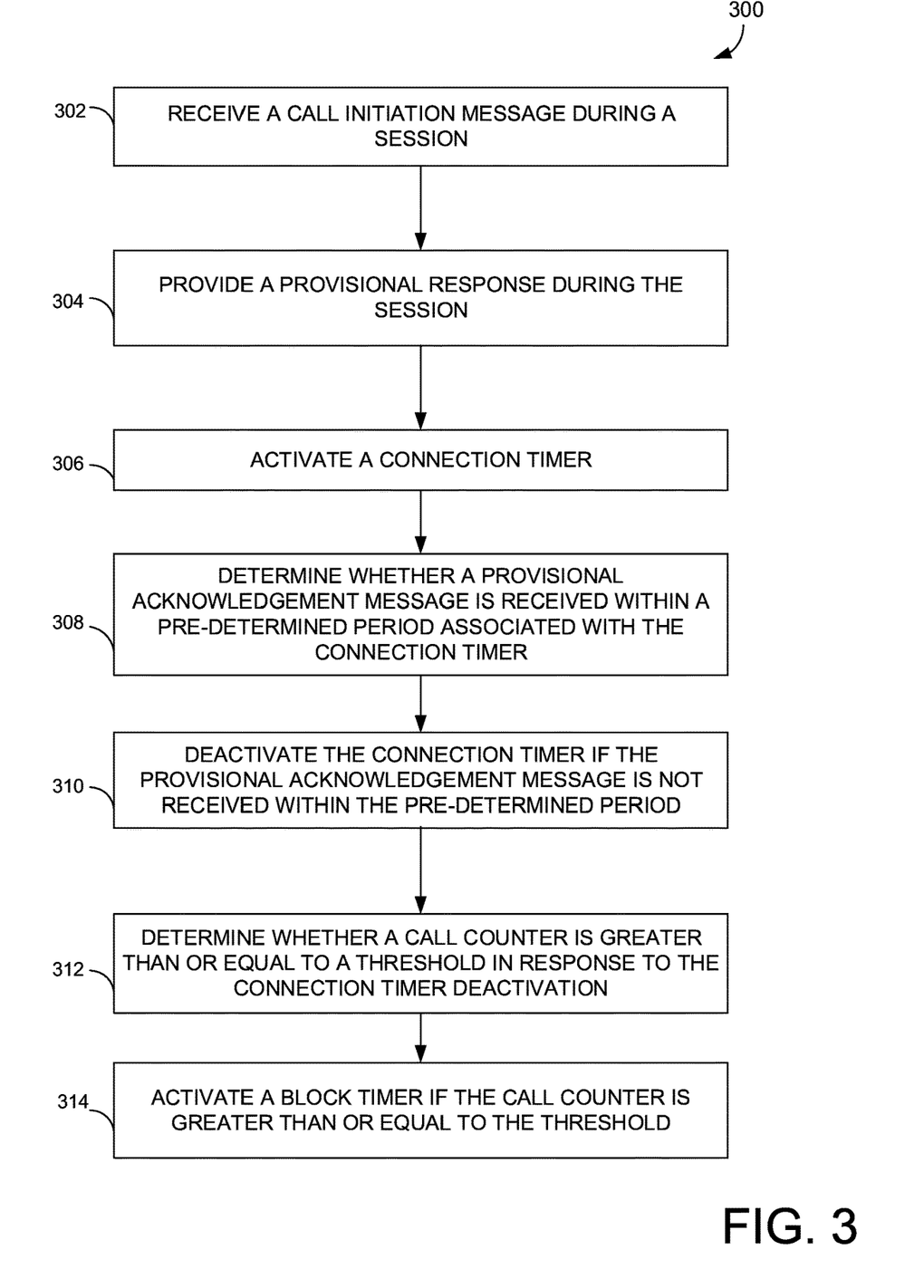
FIG. 3 depicts a flowchart of an exemplary method for preventing a denial-of-service attack at a victim agent of a network in accordance with an example embodiment.

FIG. 3 depicts a flow diagram of an exemplary method 300 for preventing a denial-of-service attack at a victim agent of a telecommunication network, in accordance with implementations of the present disclosure. Initially at block 302 a call initiation message is received by the session management system during a session (e.g., a call setup). The attacker agent may initiate a call (e.g., a VoIP call) to the victim agent. The attacker agent may transmit a call initiation message to the victim agent. At block 304, a provisional response (e.g., the 183 Session Progress message) is provided during the session. For example, the call initiation message may be provided, via one or more session management systems, to the one or more victim agents.

In some embodiments, a connection timer is activated at block 306. The session management system (e.g., the mobile originated P-CSCF or Access Security Border Controller) may activate the connection timer in response to receiving the provisional response. The connection timer may terminate or otherwise expire when it reaches a maximum delay between the provisional response received from the victim agent. In some examples, the connection timer may terminate when it reaches a maximum delay between receipt of a provisional response acknowledgement (PRACK) message sent by the attacker agent. When the connection timer terminates, a call counter (e.g., a ghost call counter) that corresponds to the attacker agent may be incremented.

Whether the provisional acknowledgement message is received within a pre-determined period associated with the connection timer activation is determined at block 308. The session management system(s) may determine that the victim agent has been victimized if the attacker agent (e.g., caller device) does not send the provisional acknowledgement message within the pre-determined period.

The connection timer is deactivated, at block 310, if the provisional acknowledgement message is not received within the pre-determined period. At block 312 whether a call counter is greater than or equal to a threshold is determined in response to the connection timer deactivation. If the provisional acknowledgement message is not received within the pre-determined period, the call counter may be incremented.

In some embodiments, a block timer is activated if the call counter is greater than or equal to the threshold at block 314. The block timer is structured to block one or more calls from the attacker agent. The block timer may be structured to block one or more calls from the attacker agent. If the call counter is greater than or equal to the threshold, the call from the attacker agent may be blocked. The attacker agent may be unable to place one or more calls while the block timer is active. In turn, the one or more victim agents may at least one of receive one or more calls or place one or more calls during the period of time the block timer is activated.

Figure 4:
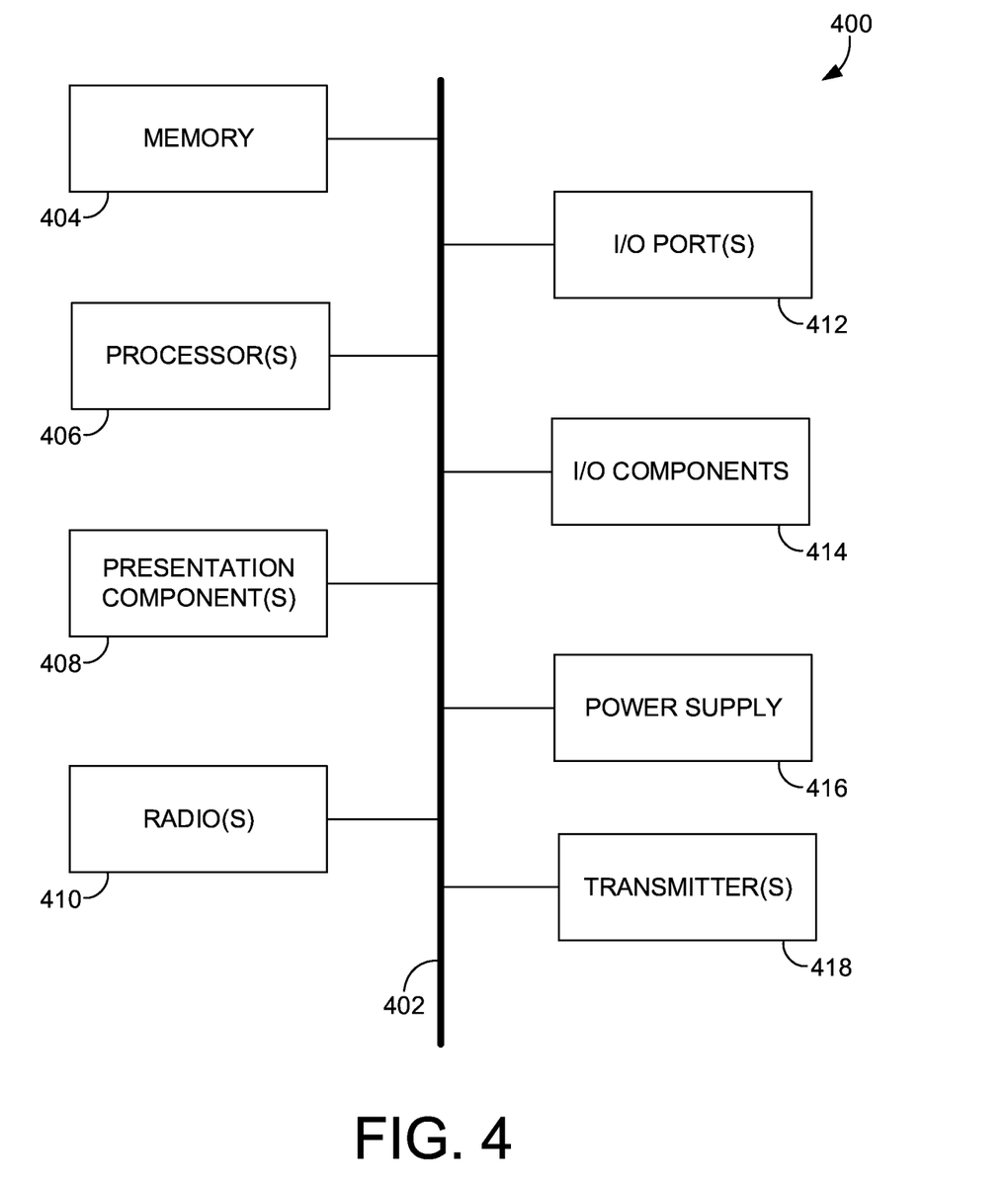
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for preventing a denial-of-service attack at a victim agent of a telecommunication network, the method comprising:
receiving, by a first session management system communicatively coupled to one or more attacker agents and at least a second session management system, a call initiation message during a session;
forwarding the call initiation message from the first session management system to the second session management system communicatively coupled to a victim agent and structured to provide the call initiation message to the victim agent;
providing a provisional response during the session;
activating a connection timer;
determining whether a provisional acknowledgement message is received within a pre-determined period associated with the connection timer;
deactivating the connection timer if the provisional acknowledgement message is not received within the pre-determined period;
determining whether a call counter is greater than or equal to a threshold in response to the connection timer deactivation; and
activating a block timer at the first session management system if the call counter is greater than or equal to the threshold, wherein the block timer prevents the one ore more attacker agents from placing one or more calls on the telecommunications network while the block timer is active.

2. The method of claim 1, wherein the victim agent is structured to at least one of receive one or more calls or place one or more calls during a period of time the block timer is activated.

3. The method of claim 1, wherein the session comprises at least one of a call setup, video setup, or message setup, and wherein the session is based on a Session Initiation Protocol (SIP).

4. The method of claim 1, wherein the call counter comprises a ghost call counter.

5. The method of claim 4, wherein the call counter is incremented if the provisional acknowledgement message is not received within the pre-determined period.

6. The method of claim 1, wherein the provisional acknowledgement message comprises a provisional response acknowledgement (PRACK) message.

7. The method of claim 1, wherein the telecommunications network comprises at least one of an access network or core network.

8. The method of claim 1, wherein the telecommunications network is communicatively coupled to the first session management system and the second session management system that at least one of establish, modify, or tear down one or more multimedia sessions.

9. Computer-readable storage media having computer-executable instructions embodied thereon that, when executed by one or more processors, cause the processors to:
receive, by a first session management system communicatively coupled to an attacker agent and at least a second session management system, a call initiation message during a session;
forward the call initiation message from the first session management system to the second session management system communicatively coupled to a victim agent and structured to provide the call initiation message the victim agent;
provide a provisional response during the session, wherein the first session management system and second session management system are structured to provide the provisional response to the attacker agent;
activate a connection timer;
determine whether a provisional acknowledgement message is received within a pre-determined period associated with the connection timer;
deactivate the connection timer if the provisional acknowledgement message is not received within the pre-determined period;
determine whether a call counter is greater than or equal to a threshold in response to the connection timer deactivation; and
activate a block timer at the first session management system if the call counter is greater than or equal to the threshold, wherein the block timer is structured to prevent the attacker agent from placing one or more calls on the telecommunications network while the block timer is active.

10. The computer-readable storage media of claim 9, wherein the victim agent is structured to at least one of receive one or more calls or place one or more calls during a period of time the block timer is activated.

11. The computer-readable storage media of claim 9, wherein the session comprises at least one of a call setup, video setup, or message setup, and wherein the session is based on a Session Initiation Protocol (SIP).

12. The computer-readable storage media of claim 9, wherein the call counter comprises a ghost call counter.

13. The computer-readable storage media of claim 12, wherein the call counter is incremented if the provisional acknowledgement message is not received within the pre-determined period.

14. The computer-readable storage media of claim 9, wherein the provisional acknowledgement message comprises a provisional response acknowledgement (PRACK) message.

15. The computer-readable storage media of claim 9, wherein the one or more session management systems comprise at least one of a P-CSCF (Proxy-Call Session Control Function) or S-CSCF (Servicing-Call Session Control Function).

16. A system for preventing a denial-of-service attack at one or more victim agents of a telecommunication network, the system comprising:
one or more victim agents; and
a first session management system and a second session management system communicatively coupled to one or more attacker agents and the one or more victim agents, a first session management system and a second session management system structured to:
receive a call initiation message during a session, wherein the one or more session management systems are structured to provide the call initiation message to the one or more victim agents;
provide a provisional response to the one or more attacker agents during the session;
activate a connection timer;
determine whether a provisional acknowledgement message is received from the one or more attacker agents within a pre-determined period associated with the connection timer;
deactivate the connection timer if the provisional acknowledgement message is not received within the pre-determined period;
determine whether a call counter is greater than or equal to a threshold in response to the connection timer deactivation; and
activate a block timer at the first session management system if the call counter is greater than or equal to the threshold, wherein the block timer is structured to prevent the attacker agent from placing one or more calls on the telecommunications network while the block timer is active.

17. The system of claim 16, wherein the one or more victim agents are structured to at least one of receive one or more calls or place one or more calls during a period of time the block timer is activated.

18. The system of claim 16, wherein the session comprises at least one of a call setup, video setup, or message setup, and wherein the session is based on a Session Initiation Protocol (SIP).

19. The system of claim 18, wherein the call initiation message comprises a SIP INVITE.

20. The system of claim 16, wherein the provisional acknowledgement message comprises a provisional response acknowledgement (PRACK) message.

* * * * *